United States Patent
Jones, IV et al.

(10) Patent No.: US 6,657,949 B1
(45) Date of Patent: Dec. 2, 2003

(54) EFFICIENT REQUEST ACCESS FOR OFDM SYSTEMS

(75) Inventors: Vincent K. Jones, IV, Redwood Shores, CA (US); James M. Gardner, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/348,718

(22) Filed: Jul. 6, 1999

(51) Int. Cl.⁷ .................................................. H04L 5/04
(52) U.S. Cl. ......................................... 370/205; 370/439
(58) Field of Search .................................. 370/204, 205, 370/208, 210, 230, 230.1, 278, 280, 281, 329, 330, 437, 438, 439

(56) References Cited

U.S. PATENT DOCUMENTS

| | | | |
|---|---|---|---|
| 5,282,222 A | | 1/1994 | Fattouche et al. |
| 5,909,436 A | * | 6/1999 | Engstrom et al. ............ 370/343 |
| 5,963,557 A | * | 10/1999 | Eng ............................ 370/432 |
| 6,031,827 A | * | 2/2000 | Rikkinen et al. ............. 370/330 |
| 6,052,594 A | * | 4/2000 | Chuang et al. .............. 455/450 |
| 6,175,550 B1 | * | 1/2001 | Van Nee ..................... 370/206 |
| 6,192,026 B1 | * | 2/2001 | Pollack et al. ............... 370/203 |
| 6,327,314 B1 | * | 12/2001 | Cimini, Jr. et al. .......... 375/340 |
| 6,333,937 B1 | * | 12/2001 | Ryan .......................... 370/468 |
| 6,370,153 B1 | * | 4/2002 | Eng ............................ 370/438 |
| 6,515,960 B1 | * | 2/2003 | Usui et al. ................... 370/203 |

OTHER PUBLICATIONS

Speth, M. et al "Minimum Overhead Burst Synchronization for OFDM Based Broadband Transmission" Global Telecommunications, vol. 5, Nov. 8–12, 1998, pp. 2777–2782.*
Morelli, M. "An Improved Frequency Offset Estimator for OFDM Applications" IEEE Communications Letters, vol. 3, Issue 3, Mar. 1990, pp. 75–77.*
Ayanoglu, E. "Adaptive ARQ/FEC for Multitone Transmission in Wireless Networks" Global Telecommunications, vol. 3, Nov. 13–17, 1995, pp. 2278–2283.*
Kumagai, T. et al "A Maximal Ratio Combining Frequency Diversity ARQ Scheme for OFDM Signals" Personal, Indoor and Mobile Radio, vol. 2, Sep. 8–11, 1998, pp. 528–532.*
Pollack et al., "Medium access control protocol for OFDM wireless networks", 1998, U.S. patent application No. 09/019,938.
Jones et al., "Differential OFDM using multiple receiver antennas", 1999, U.S. patent application No. 09/282,589.
Jones et al., "Improved system for interference cancellation", 1999, U.S. patent application No. 09/234,629.

* cited by examiner

Primary Examiner—Hassan Kizou
Assistant Examiner—Anh Vu Ly
(74) Attorney, Agent, or Firm—Ritter, Lang & Kaplan LLP

(57) ABSTRACT

Systems and methods for efficient multiplexing of multiple access requests from disparate sources within a single OFDM burst. Each of multiple subscriber units employ non-overlapping groups of OFDM frequency domain symbols within a single burst for upstream transmission of their access requests. In one embodiment, the OFDM frequency domain symbols are differentially encoded to eliminate the need for transmission of upstream training information. In an alternative embodiment, the group of frequency domain symbols within the burst employed by any particular subscriber unit are contiguous to one another. Channel training for a give subscriber unit need only be performed over the subband occupied by its group of frequency domain symbols. This greatly reduces the number of training symbols required for reception. The reduction or elimination of training symbols increases the number of access requests that may be accommodated within a single burst and/or allows for greater redundancy in transmission of access request data.

32 Claims, 10 Drawing Sheets

EFFICIENT REQUEST ACCESS FOR OFDM SYSTEMS

STATEMENT OF RELATED APPLICATIONS

The present application is related to the subject matter of the following previously filed U.S. Patent Applications.

U.S. patent application Ser. No. 09/019,938, entitled MEDIUM ACCESS CONTROL PROTOCOL FOR OFDM WIRELESS NETWORKS, filed on Feb. 6, 1998. U.S. patent application Ser. No. 09/282,589, entitled DIFFERENTIAL OFDM USING MULTIPLE RECEIVER ANTENNAS, filed on Mar. 31, 1999.

U.S. patent application Ser. No. 09/234,629, entitled SYSTEM FOR INTERFERENCE CANCELLATION, filed on Jan. 21, 1999.

The co-filed, co-assigned U.S. Patent Application entitled OPTIMAL USE OF REQUEST ACCESS TDMA SLOTS FOR AUTOMATIC LEVEL CONTROL is also related to the subject matter of the present application.

All of the related patent applications are herein incorporated by reference.

BACKGROUND OF THE INVENTION

The present invention relates to digital communication systems and more particularly to digital communication systems employing orthogonal frequency division multiplexing (OFDM).

A point to multipoint wireless communication system represents a potentially effective solution to the problem of providing broadband network connectivity to a large number of geographically distributed points. Unlike optical fiber, DSL, and cable modems, there is no need to either construct a new wired infrastructure or substantially modify a wired infrastructure that has been constructed for a different purpose.

In order to conserve scarce spectrum, the data communication devices of a point to multipoint wireless communication system may all share access to a common frequency. In a typical scenario one or more frequency channels are allocated to downstream broadcast communication from a central access point to a plurality of subscriber units and one or more separate frequency channels are allocated to upstream communication from the subscriber units to the central access point. For upstream communication there is a medium access control (MAC) protocol that determines which subscriber unit is permitted to transmit at which time so as not to interfere with transmission from other subscriber units. For a given upstream frequency, the time domain is divided into frames which are typically of equal duration where each frame represents an individually allocable unit in the time domain. For frames transmitting upstream data, one subscriber unit transmits in each frame. Certain other frames are, however, reserved for access requests by subscriber units. The access request frames are not reserved for any particular subscriber unit in advance. Any subscriber unit wishing to transmit data upstream may transmit its access request in the access request frame. If multiple subscriber units transmit simultaneously in an access request frame there is a collision. The colliding subscriber units will detect the collision and attempt to retransmit their access request after a wait period that is defined pseudo-randomly at each subscriber unit so as to reduce the probability of further collisions.

Orthogonal frequency division multiplexing (OFDM) systems offer significant advantages in many real world communication systems, particularly in environments where multipath effects impair performance. OFDM divides the available spectrum within a channel into narrow subchannels. In a given so-called "burst," each subchannel transmits one data symbol. Each subchannel, therefore, operates at a very low data rate compared to the channel as a whole. To achieve transmission in orthogonal subchannels, a burst of frequency domain symbols are converted from the time domain by an inverse Fast Fourier Transform (IFFT) procedure. To assure that orthogonality is maintained in dispersive channels, a cyclic prefix is added to the resulting time domain sequence. The cyclic prefix is a duplicate of the last portion of the time domain sequence that is appended to its beginning. To assure orthogonality, the cyclic prefix should be as long as the duration of the impulse response of the channel. It is desirable to use OFDM in point to multipoint networks where multipath effects are a concern.

Upstream access requests typically contain very little data. Using an entire frame for an access request from a single subscriber unit is therefore very inefficient. One solution is to multiplex multiple access requests from multiple subscriber units within the same frame in a way that avoids collisions. In an OFDM system one way to accomplish this is to allocate different frequency domain subchannels to different subscriber units so that multiple subscriber units effectively share an OFDM burst and may each transmit their own access request within their own grouping of subchannels. Such a technique is disclosed in U.S. patent application Ser. No. 09/019,938.

To assure maximum performance, an OFDM burst carrying data from a subscriber unit should contain v frequency domain training symbols having predetermined values to assist the receiver in estimating the channel response where v is greater than or equal to the number of symbol periods in a duration of the impulse response from the subscriber unit to the central access point. Symbols used for training are then unavailable for transmission of data. Loss of efficiency due to the inclusion of training symbols is compounded where multiple subscriber units share a single OFDM burst. In the system described in U.S. patent application Ser. No. 09/019,938, each subscriber unit must transmit v training symbols as part of its own grouping within the access request OFDM burst. Thus within a single OFDM burst, there are R*v symbols devoted to training where R is the number of subscriber units sharing the burst. What is needed are systems and methods for more efficiently multiplexing transmissions of multiple subscriber units within the same OFDM burst.

SUMMARY OF THE INVENTION

Systems and methods for efficient multiplexing of multiple access requests from disparate sources within a single OFDM burst are provided by virtue of the present invention. Each of multiple subscriber units employ non-overlapping groups of OFDM frequency domain symbols within a single burst for upstream transmission of their access requests. In one embodiment, the OFDM frequency domain symbols are differentially encoded to eliminate the need for upstream transmission of training information. In an alternative embodiment, the group of frequency domain symbols within the burst employed by any particular subscriber unit are contiguous to one another. Channel training for a given subscriber unit need only be performed over the subband occupied by its group of frequency domain symbols. This greatly reduces the number of training symbols required for reception. The reduction or elimination of training symbols increases the number of access requests that may be accommodated within a single burst and/or allows for greater redundancy in transmission of access request data.

One aspect of the present invention provides apparatus for operating a selected data communication device to request access to a shared medium employed by a digital communication system. The apparatus includes a burst forming system that forms frequency domain symbols of an OFDM burst. A first group of frequency domain symbols within the burst includes differentially encoded data and a second group of frequency domain symbols in the burst includes zero values to allow for data transmitted by other data communication devices. The apparatus further includes a converter that transforms frequency domain symbols of the OFDM burst into time domain symbols, and a transmitter system that transmits the time domain symbols as a request for access to the shared medium.

Further understanding of the nature and advantages of the invention herein may be realized by reference to the remaining portions of the specification and the attached drawings.

DESCRIPTION OF SPECIFIC EMBODIMENTS

Figure 1:
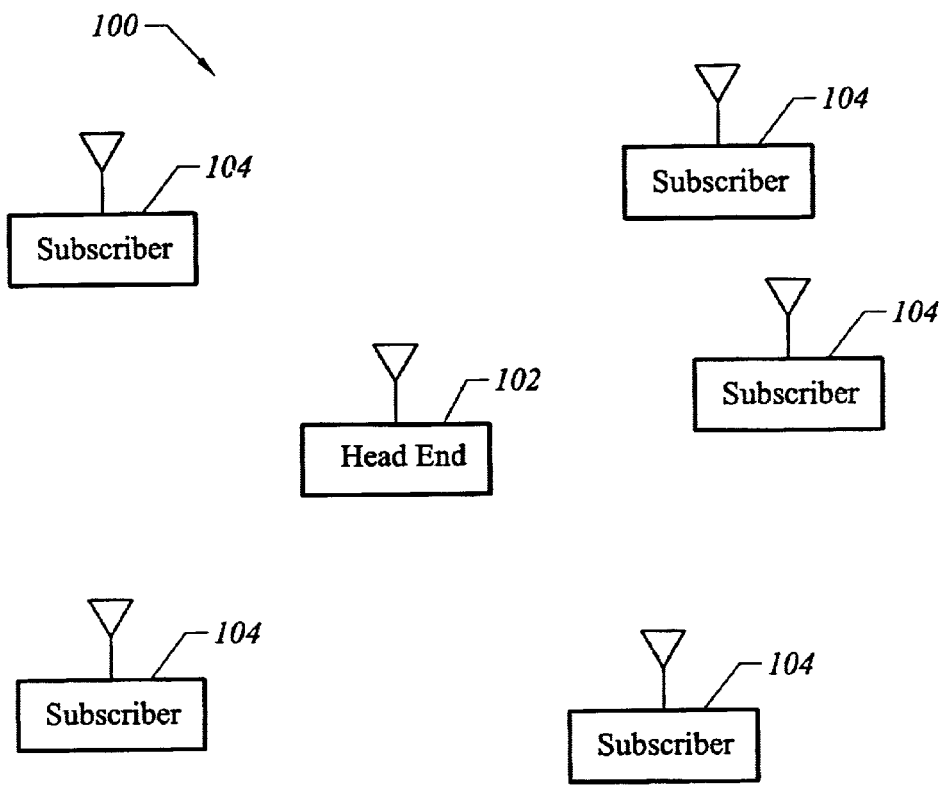
FIG. 1 depicts a point to multipoint communication network suitable for implementing one embodiment of the present invention.

FIG. 1 depicts a point to multipoint wireless communication network 100 suitable for implementing one embodiment of the present invention. Network 100 includes a central access point or headend 102 and multiple subscriber units 104. All communication is typically either to or from central access point 102. Communication from central access point 102 to one or more subscriber units 104 is herein referred to as downstream communication. Communication from any one of subscriber units 104 to central access point 102 is herein referred to as upstream communication. In one embodiment, different frequencies are allocated to upstream and downstream communication. In some alternative embodiments, subscriber units 104 may communicate with one another directly.

Each of one or more upstream frequencies is common to multiple subscriber units. To prevent collisions between subscriber units when accessing the shared medium to transmit data upstream, a medium access control (MAC) protocol is provided. For each upstream frequency, the time domain is divided into frames or slots. An individual frame may be allocated for upstream data transmission by a particular subscriber unit. The schedule of which subscriber units are permitted to transmit in which frames is distributed in a scheduling message sent downstream by central access point 102. In a typical system, when a particular subscriber unit wishes to transmit data upstream, it sends a special transmission known as an access request upstream to central access point 102 to request access to the shared medium. Particular frames or slots are reserved for transmission of the access request. According to the present invention, multiple subscriber units may transmit access requests upstream within the same access frame without causing a collision.

Network 100 may employ OFDM. The abbreviation "OFDM" refers to Orthogonal Frequency Division Multiplexing. In OFDM, the available bandwidth is effectively divided into a plurality of subchannels that are orthogonal in the frequency domain. During a given symbol period, the transmitter transmits a symbol in each subchannel. To create the transmitted time domain signal corresponding to all of the subchannels, an FFT is applied to a series of frequency domain symbols. The resulting time domain burst is augmented with a cyclic prefix prior to transmission. The cyclic prefix addition process can be characterized by the expression:

$$[z(1)\ldots z(N)]^T \rightarrow [z(N-v+1)\ldots z(N)z(1)\ldots z(N)]^T$$

On the receive end, the cyclic prefix is removed from the received time domain symbols. An IFFT is then applied to recover the simultaneously transmitted frequency domains symbols. The cyclic prefix has length v where v is greater than or equal to a duration of the impulse response of the channel. The cyclic prefix assures orthogonality of the frequency domain subchannels.

There are other ways of creating transmitted bursts of symbols in orthogonal subchannels or substantially orthogonal subchannels including, e.g., use of the Hilbert transform, use of the wavelet transform, using a batch of frequency upconverters in combination with a filter bank, etc. Wherever the term OFDM is used, it will be understood that this term includes all alternative methods of simultaneously communicating a burst of symbols in orthogonal or substantially orthogonal subchannels defined by procedures performed on a time domain sequence. The term frequency domain should be understood to refer to any domain that is divided into such orthogonal or substantially orthogonal subchannels.

Figure 2:
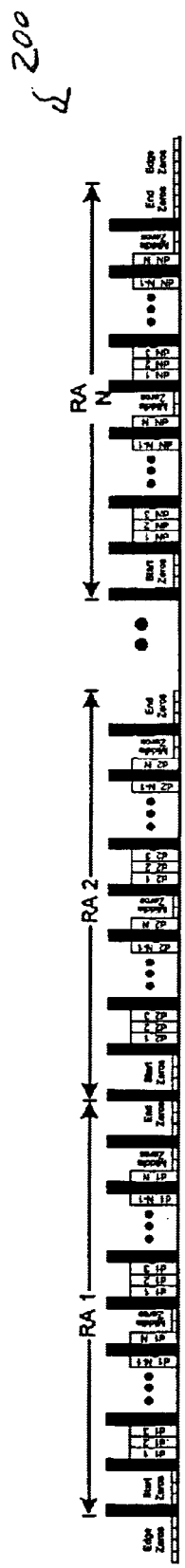
FIGS. 2A–2C depict the internal structure of an OFDM request access burst incorporating reduced training information according to one embodiment of the present invention.
Figure 2A:
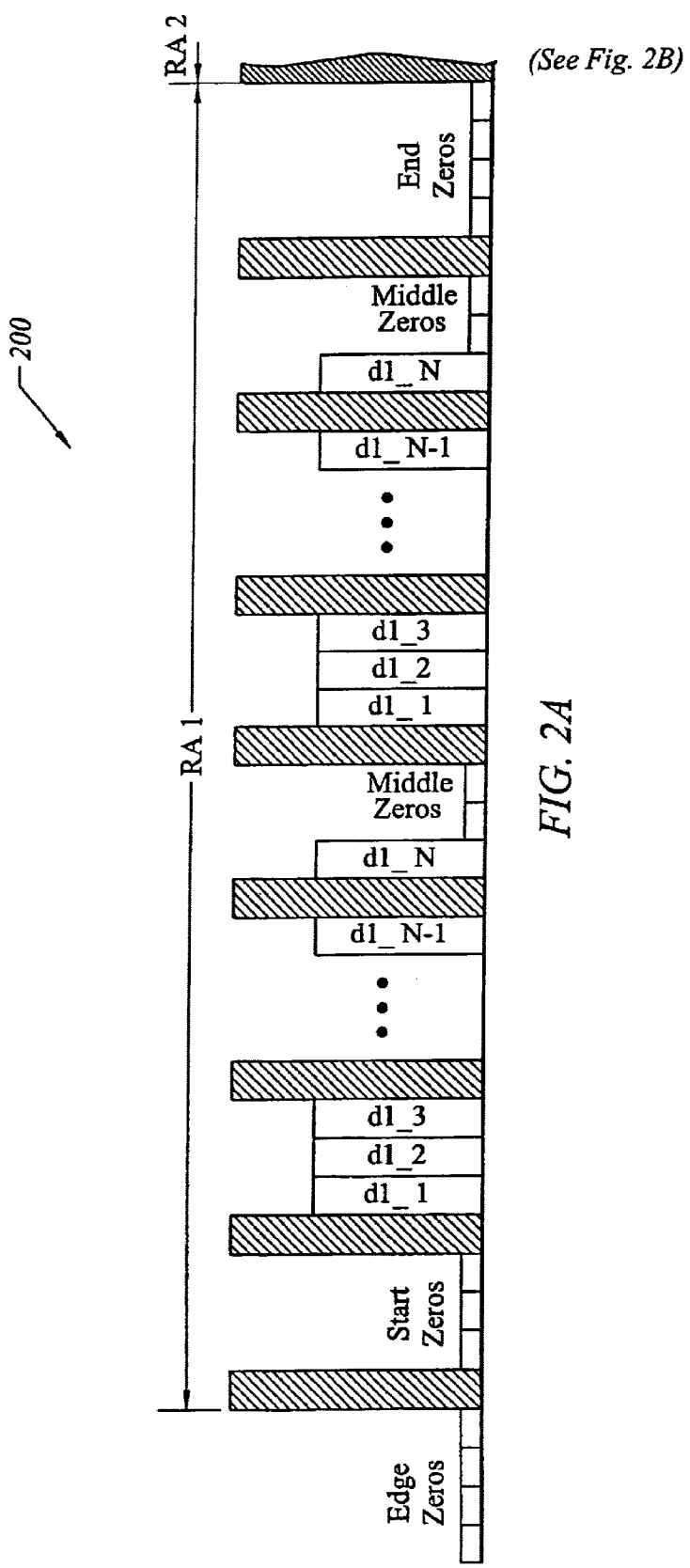
Figure 2B:
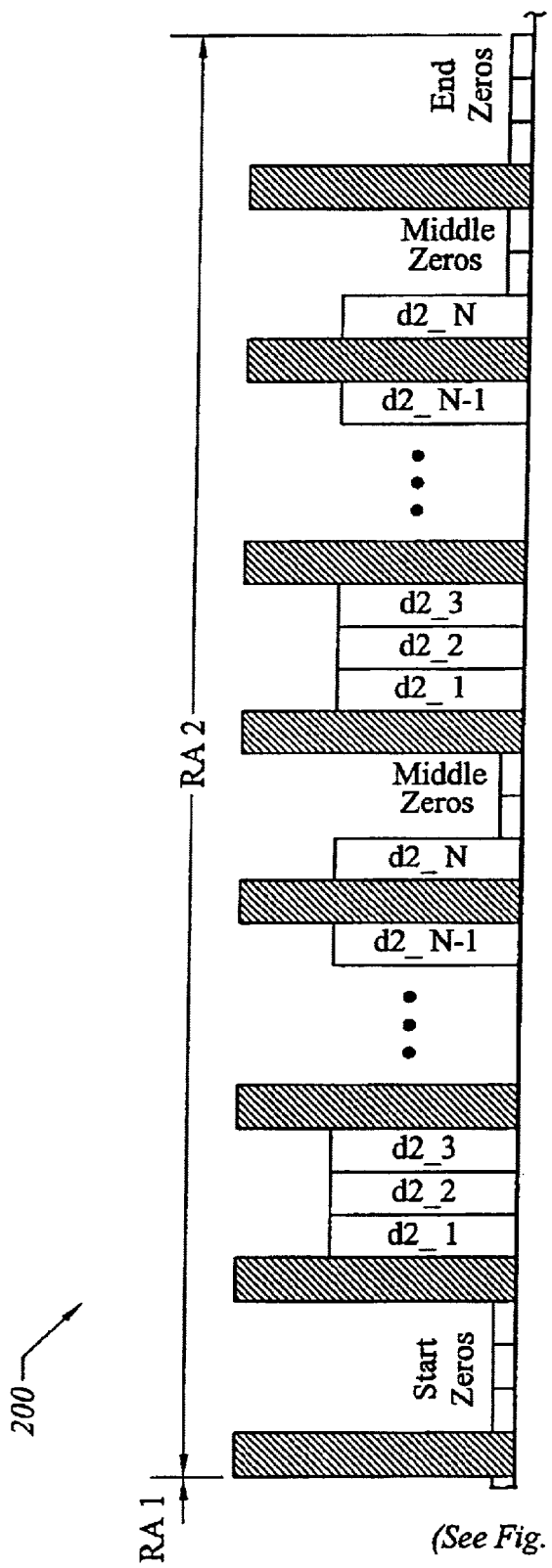
Figure 2C:
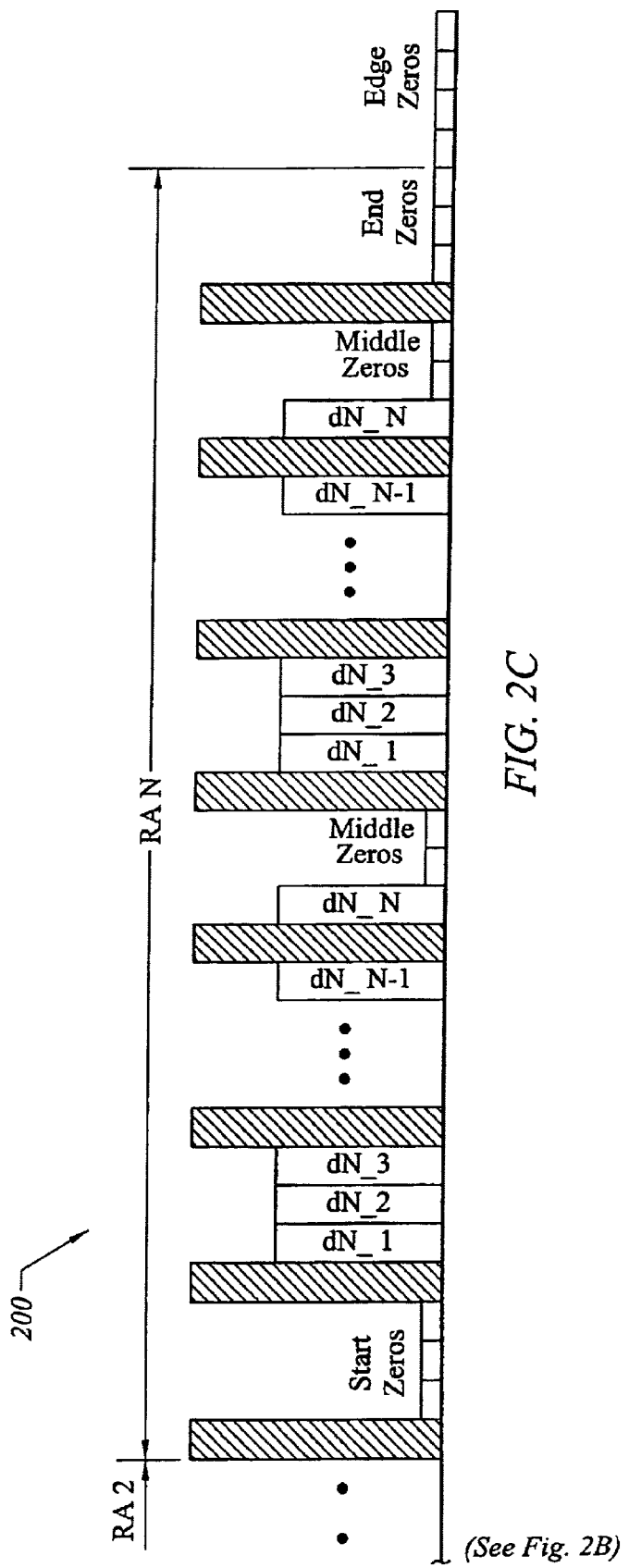

FIGS. 2A–2C depict the contents of a request access OFDM burst according to one embodiment of the present invention wherein each of multiple subscriber units are allocated contiguous subgroups of OFDM frequency domain symbols. In the discussion that follows, the frequency domain symbols are also referred to as "tones." An OFDM request access (RA) burst includes data tones, channel training tones and zero tones. FIGS. 2A–2C show the tone positions as they would appear at the receiver end. At either end of the burst, there are $N_{edge}$ zero tones where $N_{edge}$ equals between $(N-v)/10$ and $(N-v)/20$ where N is the IFFT size and v is the number of training symbols to be included within the burst.

Besides the edge tones, the remaining tones are evenly divided into $N_{user}$ RA tone sets of size $N_{ra}$. Each subscriber unit transmits using only one of the RA tone sets and sets the remaining tone sets to have zero value. When requesting access, each subscriber unit pseudo-randomly determines the tone set that it will use. Each RA tone set contains $N_{tt}$ training tones that in the depicted example occupy every fourth tone starting with the first tone in the tone set. The training tones will have one of four values:

$$Z_T(n)=\{A,-A,iA,-iA\},$$

where the amplitude A will depend on which constellation type (e.g., 4-QAM, 16-QAM) is being used for data. This choice of training tone values removes the need for any division or multiplication of these values in the channel estimation processing. The number of training tones in each RA tone set may be less than the impulse response duration in symbol periods.

Each tone set includes $N_{ra}$ tones. The remaining $N^{ra}-N_{tt}$ tones are used to transmit the subscriber unit's access request data and some zero tones. To increase the probability of accurate reception of the access request data even under difficult channel conditions, the access request data is duplicated $N_{red}$ times to implement repetition coding. For each repetition of the data there are $N_{zm}$ zero tones. Furthermore, at the beginning of the RA tone set there are $N_{zs}$ zeros and at the end of the RA tone set there are $N_{ze}$ zero tones. Each repetition of the data includes $N_{data}$ data tones so that each RA tone set includes $N_d=N_{data}N_{red}$ data tones. Zero tones are positioned to ensure that the data tones are centered within the training tones, that the training tones are spaced evenly across RA tone sets as seen by the receiver, and that there is equal spacing between all redundant data tones within a tone set.

Figure 4:
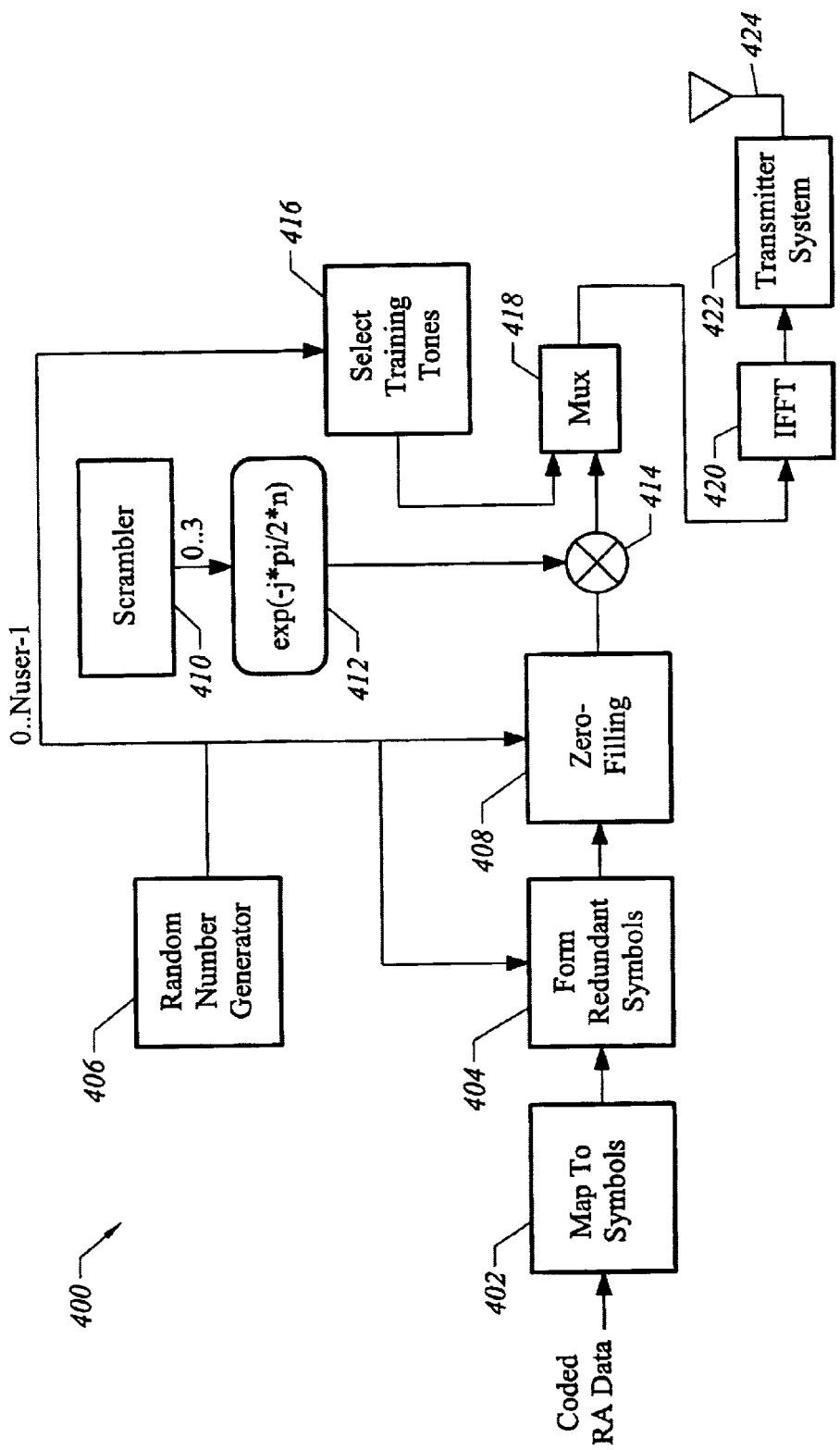
FIG. 4 depicts apparatus for transmitting the request access burst of FIG. 2 according to one embodiment of the present invention.

FIG. 4 depicts a system for generating and transmitting a single RA tone set within request access burst 200 as will be generated by a single subscriber unit. Binary request access data is input into a symbol mapper 402. The request access data is has preferably been coded employing error correction coding techniques such as convolutional coding, block coding, Reed-Solomon coding, etc. A random number generator 406 selects for each access request the particular RA tone set that will be used by the subscriber unit. A redundant symbol formation block 404 positions the RA data symbols within the burst and creates the redundant data sets as shown in FIGS. 2A–2C. A zero-filling block 408 positions the zero tones within the burst including the zero values corresponding to the non-selected RA tone sets.

The phases of the frequency domain symbols within the RA burst are scrambled prior to transmission. The phases are scrambled according to a scrambling pattern or scrambling code that assigns a scrambling phase value to each tone position within the burst. Each RA tone set therefore has its own unique section of the phase scrambling pattern. The reason for the phase scrambling is that certain combinations of request access data symbols will result in an excessive peak to mean power ratio (PMPR) for the burst as received. If the phase scrambled symbol values generated for a particular request access burst result in excessive PMPR, the receiver FFT will saturate resulting in a failed access request. In response to the lack of acknowledgement, the access request will be retransmitted. Now, however, random number generator 406 will likely select a different RA tone set for use in requesting access. The request access tones will be shifted to a different portion of the burst and subject to phase scrambling by a different section of the phase scrambling pattern giving rise to a different PMPR value. Repeated transmissions using different RA tone sets will quickly result in a successful transmission that does not saturate the receiver FFT. It is highly probable that the second transmission will be successful if the first transmission results in saturation.

The phase scrambling pattern consists of a series of values ranging from 0 to 3. A phase scrambling storage block 410 generates the values of the pattern in succession. A complex exponential block 412 represents the translation of the values ranging from 0 through 3 into four possible phase rotation values: $0, \pi/2, \pi, 3\pi/2$. A phase rotator 414 applies the phase scrambling phase shifts to the zero-filled and repetition coded RA symbols. A training tone selection block 416 generates training tones at the appropriate positions depending on the RA tone sets selected by random number generator 406. A multiplexer 418 selects between the zero filled redundant sets of RA data symbols and the training tones depending on the position within the burst. The output of multiplexer 418 is the complete set of frequency domain symbols for the burst as transmitted by a particular subscriber unit 104.

IFFT block 420 converts the frequency domain symbol burst into a time domain symbol burst and affixes the cyclic prefix to the beginning of the time domain symbol burst. A transmitter system 422 performs all additional digital and analog signal processing necessary to generate an RF signal for transmission over the airwaves where the RF signal has been modulated using the baseband time domain symbols output by IFFT block 420. Transmitter system 422 transmits the RF signal upstream via an antenna 424.

Figure 5:
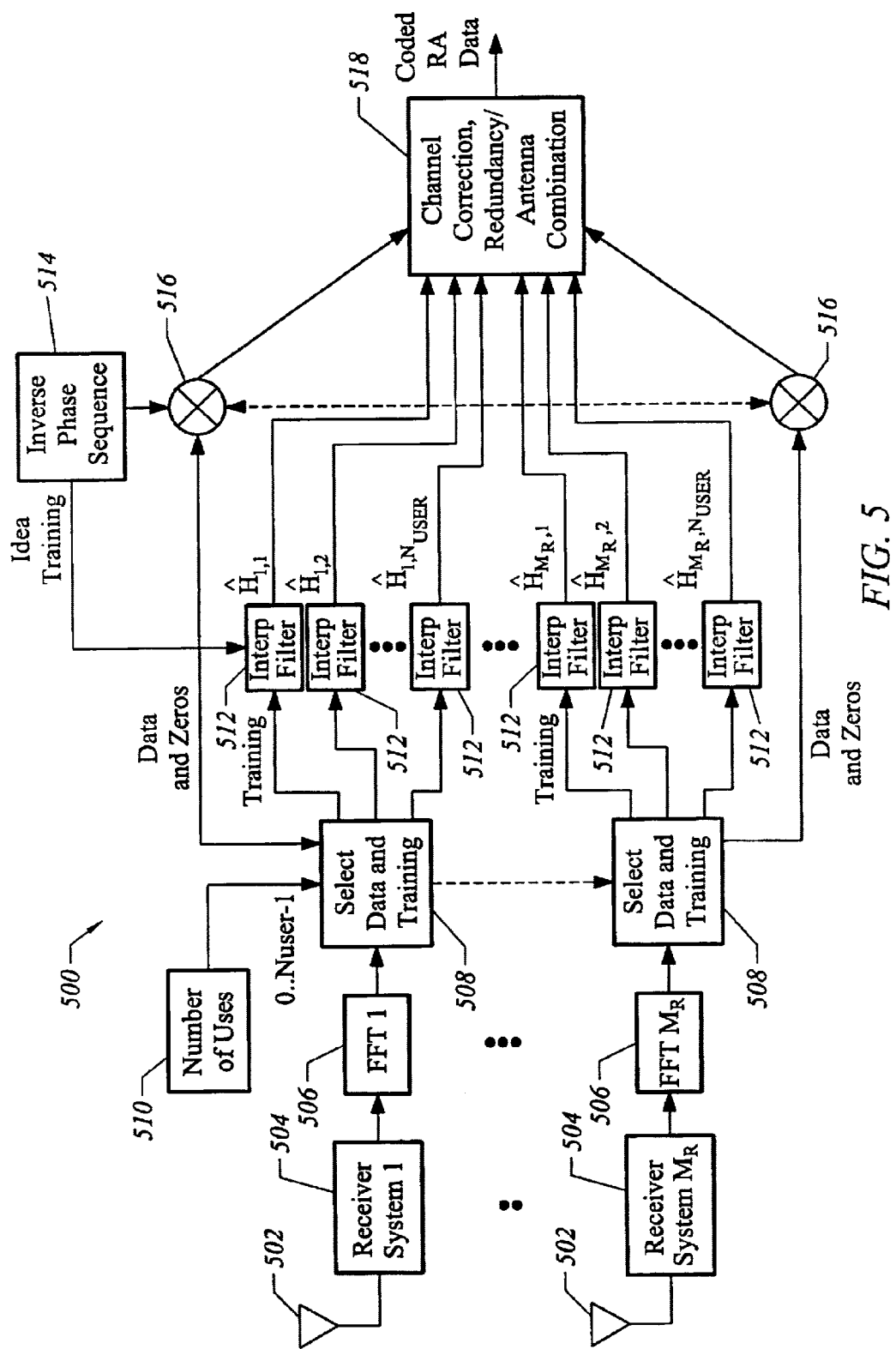
FIG. 5 depicts apparatus for receiving the request access burst of FIG. 2 according to one embodiment of the present invention.
Figure 6:
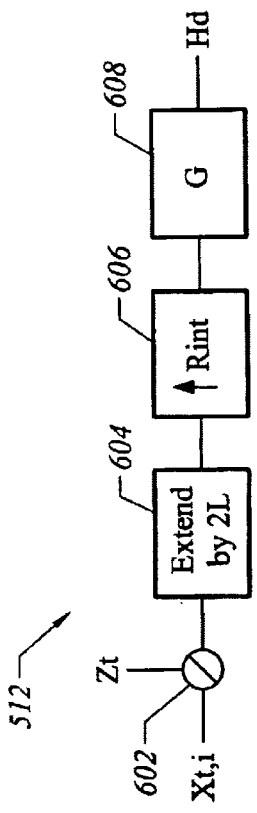
FIG. 6 depicts apparatus for performing channel training on a subband of the request access burst of FIG. 2 according to one embodiment of the present invention.

FIG. 5 depicts a system 500 for receiving and processing the OFDM RA burst of FIGS. 2A–2C. System 500 would typically be implemented at central access point 102. System 500 takes advantage of signals received via $M_R$ antennas 502. However, the present invention may also be applied in the context of receivers only employing a single antenna.

For each antenna 502, there is a receiver system 504. Receiver system 504 performs all of the analog and digital signal processing operations necessary to recover baseband time domain symbols from the modulated RF signal received via the antennas 502. A series of FFT blocks 506 remove the cyclic prefix from successive time domain OFDM bursts and convert the time domain OFDM bursts to the frequency domain using the FFT. A group of selection blocks 508 then separate the tones from each RA tone set depicted in FIGS. 2A–2C. The selection blocks 508 are aware of a number of users 510 for which RA OFDM burst 200 has been configured. Each selection block 508 outputs data tone values and zero tone values for all subscriber units as received via a particular antenna. Each selection block 508 also outputs training values for each user as received by a particular one of antennas 502.

Channel estimations are performed separately for each subscriber unit based on the training tones within the subscriber unit's RA tone set. According to the present invention, each RA tone set in burst 200 includes a number of training tones sufficient to establish channel response within the tone set but not over the burst as a whole. An interpolation technique is used to establish the channel response over all the tones of the tone set based on the training tone values as received. Each of a series of interpolation filters 512 obtains the channel response for a single combination of antenna and RA tone set. The predetermined training tone values as transmitted are obtained from an inverse phase sequence/training tone block 514.

Each of interpolation filters 512 operates as follows. Let the vector $Z_t$ be the ideal $N_{tt}$ training tones in an RA tone set, and the vector $X_{t,i}$ be the received values from antenna i for the training tones. An estimate of the channel at the training tone positions is formed by a quotient block 602 taking the quotient of these two values:

$$\hat{H}_{t,i}=(X_{t,i} \div Z_t),$$

where the symbol ÷ represents element-by-element division. Since $Z_t$ is defined as given earlier, this operation does not require any multiplies or divides.

An estimate of the channel at the data tones is formed by interpolating $\hat{H}_{t,i}$. This is done by first extending $\hat{H}_{t,i}$, zero-stuffing the resultant extended vector with $r_{int}-1$ zeros, and convolving the zero-stuffed vector with an interpolation filter, G, of length 2L+1. Therefore:

1. Let $\hat{H}_{t,i}$ be a vector of values $\hat{H}_{t,i}$ an extrapolation block 604 forms $$\hat{H}ext_{t,i}=[\hat{H}low_{t,i}\hat{H}_{t,i}\hat{H}high_{t,i}],$$

where $$\hat{H}low_{t,i}(n)=\hat{H}_{t,i}(1)-n(\hat{H}_{t,i}(2)-\hat{H}_{t,i}(1)), n=1 \ldots L$$

$$\hat{H}high_{t,i}(n)=\hat{H}_{t,i}(N_{TT})-n(\hat{H}_{t,i}(N_{TT}-1)-\hat{H}_{t,i}(N_{TT})), n=1 \ldots L$$

2. An upsampler 606 zero-stuffs according to:

$$\hat{H}ext_{t,i}=[\hat{H}ext_{t,i}(1)00 \ldots 0\hat{H}ext_{t,i}(2)0 \ldots ]$$

3. A filter block 608 then filters according to:

$$\hat{H}_i(n) = \sum_{m=-L}^{L} \hat{H}ext_{t,i}(n-m)G(m)$$

The number of complex operations required to form $\hat{H}_i(n)$ for each data tone in an RA slot, neglecting multiplications involving zero, is $(2L+1)N_{red}N_{data}$. This channel estimation technique provides an adequate estimate over a particular subband even when the number of training tones is less than the number of symbol periods in the channel impulse response from the subscriber unit to the central access point.

Inverse phase sequence/training tone block 514 outputs an inverse phase scrambling pattern that is an inverse of the phase scrambling pattern applied at the subscriber units 104. A set of phase rotators 516 for each antenna 502 applies the phase rotation to undo the effects of phase scrambling. A channel correction and antenna combining block 518 corrects the access request data as received based on the measured channel response, optimally combines the request access data as received via the multiple antennas 502, and furthermore optimally combines the multiple repetitions of data within each RA tone set. The output of block 518 is a series of cost metric or soft decision values for each bit which can then be used by a Viterbi decoder or trellis decoder to remove the effects of convolution encoding. A later stage or stages can then remove the effects of other error correcting codes applied at the transmit end. The operation of block 518 will first be explained with reference to an embodiment wherein there is no repetition of data within an RA tone set.

After conversion to the frequency domain, the receive value for each symbol is:

$$X_i(n)=H_{i,j}(n)Z_j(n)+W_i(n)$$

where $X_i$ and $W_i$ are the frequency domain received symbol and noise/interference values at tone position n.

The term $H_{ij}(n)$ is the channel response at tone n from user j to antenna i. The term $Z_j(n)$ is the transmitted symbol by user j in tone n. The use of both j and n is redundant since for any tone value n, there is just one user j. However, this notation will be used in order to emphasize certain aspects of the processing.

The maximum likelihood solution for decoding the received symbols when there is no redundancy in an RA tone set is $$\min_{Z_j(n)} \left\| R_w^{-1/2}(n)(\hat{H}_j(n)Z_j(n) - X(n)) \right\|_2^2,$$

where $R_w(n)=E[W(n)W^*(n)]$ is the (size $M_R \times M_R$) spatial covariance matrix of the interference and noise at tone n, $\hat{H}_j$ is an $M_R$-length vector of the estimated channel values from user j at tone n, and X(n) is an $M_R$-length vector of received symbols at tone n. Details of computing the spatial covariance matrix are described in U.S. patent application Ser. No. 09/234,629. The weighted-Euclidean cost function is computed as follows:

1. Antenna Combining and Channel Correction:

$$\hat{Z}_j(n) = \frac{\sum_{i=1}^{M_R} \hat{H}^*_{i,j}(n)/\sigma^2_{i,j}(n)X_i(n)}{\sum_{i=1}^{M_r} (\hat{H}^*_{i,j}(n)\hat{H}_{i,j}(n))/\sigma^2_{i,j}(n)}$$

2. Channel Confidence:

$$p(n) = \sum_{i=1}^{M_r} (\hat{H}_{i,j}(n)\hat{H}_{i,j}(n))/\sigma^2_{i,j}(n).$$

Then, the cost metric for symbol $Z_j(n)$, is given by $$c(n)=p(n)|Z_j(n)-\hat{Z}_j(n)|^2.$$

Constellation bit mapping (CBM) is used to determine the cost metrics of each bit in the symbol at tone n. Details of CBM are described in U.S. patent application Ser. No. 09/234,629. The interference energy, $\sigma^2_{ij}(n)$ is calculated as $$\sigma_{i,j}^2(n)=E\{|X(n)-\hat{H}_{i,j}(n)Z_{i,j}(n)|\}^2$$

where $Z_{ij}(n)$ is the nearest ideal QAM value to $\hat{Z}_{i,j}$, and $\hat{Z}_{i,j}$ is the single antenna corrected symbol value:

$$\hat{Z}_{i,j}(n) = \frac{\hat{H}^*_{i,j}(n)X_i(n)}{\hat{H}^*_{i,j}(n)\hat{H}_{i,j}(n)}$$

The expectation $\sigma^2_{ij}(n)$ is performed across all the data tones in an RA. Thus, there will be one power estimate for each RA slot and each antenna.

The above technique can be modified with bursts that employ redundancy as in FIGS. 2A–2C. The data should be coherently combined across redundant subsets within each tone set. In the antenna combining and channel correction step each redundant set of data is treated as originating with a separate antenna.

Interference energy estimates are, however, averaged over redundant subsets, so that there is only one value of $\sigma^2_{ij}$ for each user and each antenna. The weighted-Euclidean cost function is then obtained by:

$$\hat{Z}(n) = \frac{\sum_{m \in J_{red}} \sum_{i=1}^{M_r} \hat{H}^*_{i,j}(m)/\sigma^2_{i,j}X_i(m)}{\sum_{m \in J_{red}} \sum_{i=1}^{M_r} (\hat{H}^*_{i,j}(m)\hat{H}_{i,j}(m))/\sigma^2_{i,j}}$$

where $J_{red}$ is the set of tones n that have redundant data.

Then, $$p(n) = \sum_{m \in J_{red}} \sum_{i=1}^{M_r} (\hat{H}_{i,j}^*(m) \hat{H}_{i,j}(m))/\sigma_{i,j}^2.$$

Constellation bit mapping is performed for each combined symbol Z(n) as described earlier.

Figure 3:
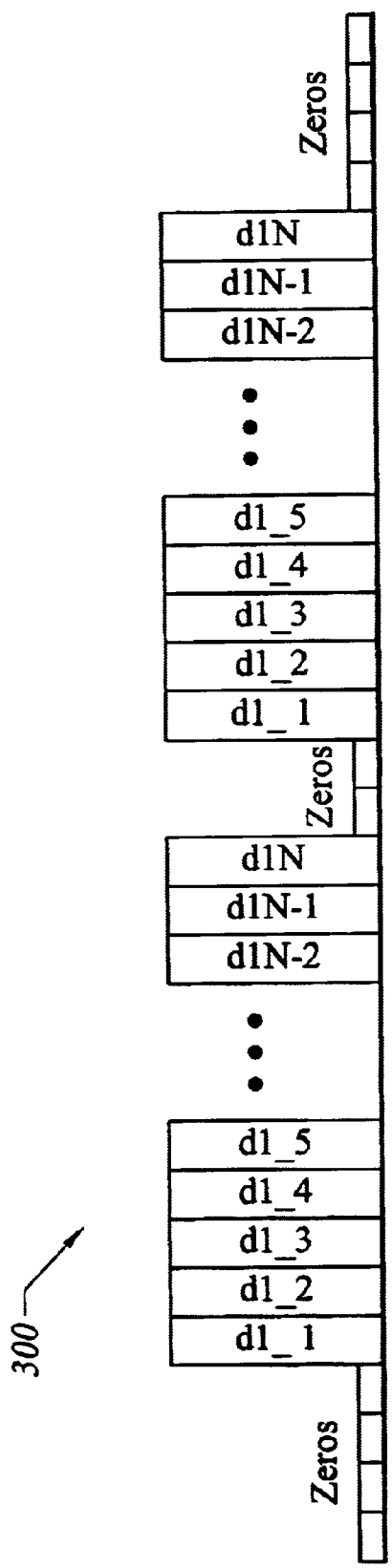
FIG. 3 depicts internal structure of an OFDM request access burst incorporating differential coding according to one embodiment of the present invention.

FIG. 3 depicts an alternative request access OFDM burst structure 300. In burst 300, as in the burst structure depicted in FIGS. 2A–2C, there are multiple request access tone sets. In burst 300, however, there are no tones allocated to training. This increases the number of tones that are allocated to data. It is therefore possible to have each subscriber unit transmit more data within its access request, include more access requests within the same OFDM burst, and/or include more redundant sets of access request data. The structure of burst 300 is similar to that of burst 200 except that training tones have been replaced by data tones. Although data tones for each subscriber unit are depicted as contiguous, this is not necessary. In order to function without the use of training symbols, the access request data of burst 200 is differentially encoded as phase differences between successive frequency domain symbols. Because the receiver system does not take received magnitude into account in estimating the transmitted data, variation in channel response magnitude does not affect system performance. Variations in phase response within bounds also do not corrupt data transmission because any phase difference applied by the channel is effectively subtracted out as a part of the differential decoding process.

Figure 7:
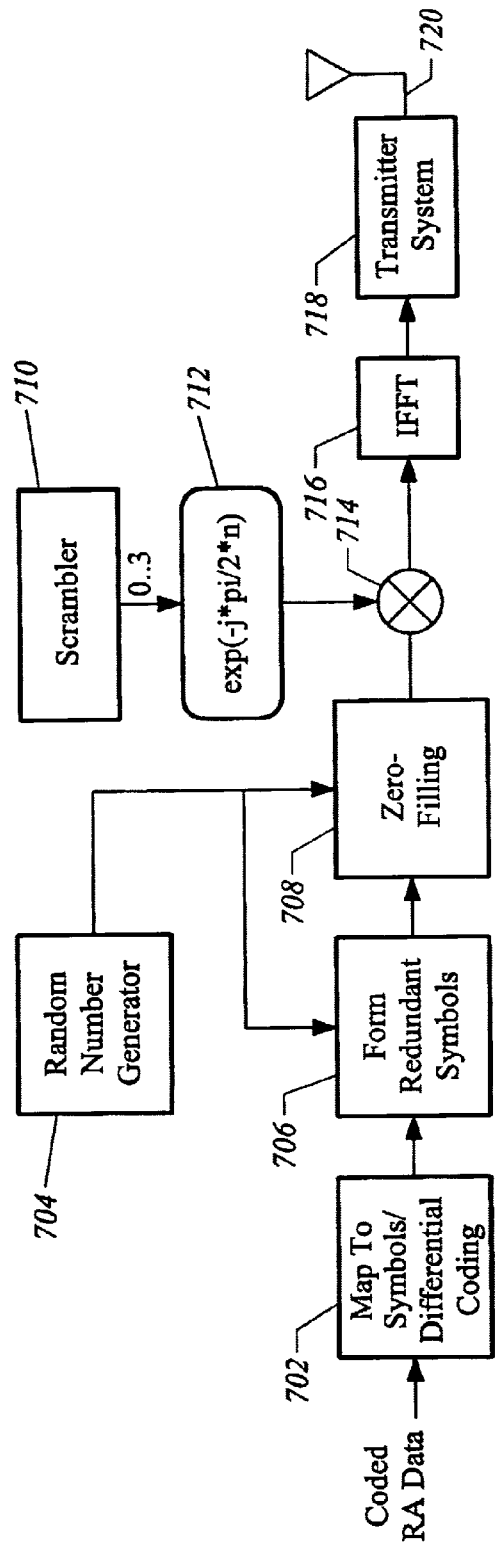
FIG. 7 depicts apparatus for transmitting the request access burst of FIG. 3 according to one embodiment of the present invention.

FIG. 7 depicts a system 700 for developing and transmitting the OFDM burst of FIG. 3 according to one embodiment of the present invention. System 700 will be employed in one of subscriber units 104. A mapper 702 generates successive frequency domain symbols based on request access data that has already been subject to error correction coding. Symbols selected by mapper 702 preferably belong to a phase shift key (PSK) constellation where all symbols have the same magnitude but different phase. Mapper 702 operates so that phase differences between each two consecutive symbols represents one or more bits of coded request access data, the number of bits depending on the particular PSK scheme used. Details of differential coding techniques are disclosed in U.S. patent application Ser. No. 09/282,589. A random number generator 704 selects a value that identifies which RA tone set within the burst is to be employed. A redundant symbol formation block 706 then places the symbols output by mapper 702 within the burst according to the RA tone set assigned by random number generator 704 and includes redundant tones as was discussed with reference to FIG. 4. A zero-filling block 708 supplies zero values at the appropriate tone positions.

A scrambler 710 generates the phase scrambling pattern of values 0 through 3 as was discussed with reference to FIG. 4. A complex exponential block 712 then determines a phase difference corresponding to each value generated by scrambler 710. A phase rotator 714 applies the appropriate phase difference for each frequency domain symbol position within the burst.

An IFFT block 716 then converts the phase scrambled frequency domain symbols to the time domain and adds a cyclic prefix. The time domain symbols output by IFFT block 716 are baseband digital values. A transmitter system 718 converts the baseband values to analog and performs all analog and digital signal processing operations necessary for generating an RF signal modulated with the OFDM time domain signal.

Figure 8:
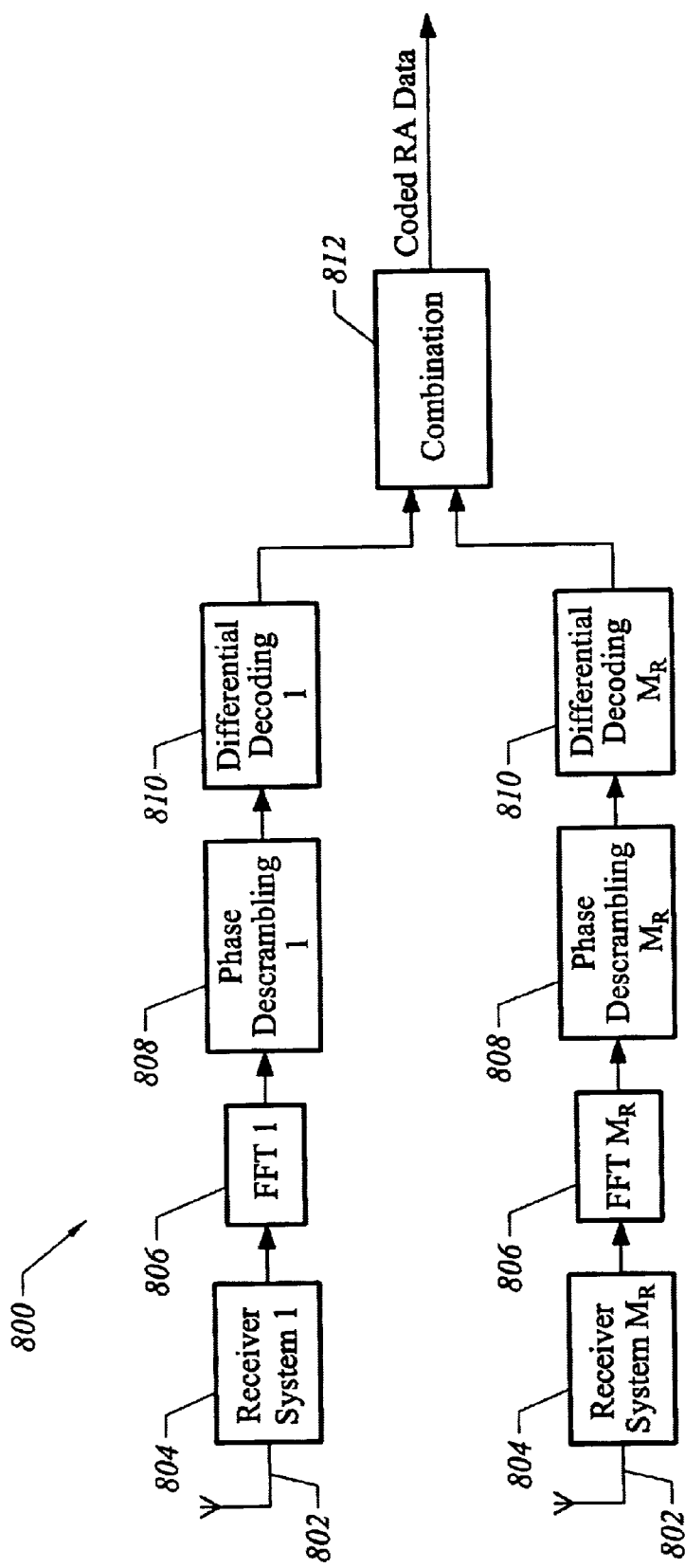
FIG. 8 depicts apparatus for receiving the request access burst of FIG. 3 according to one embodiment of the present invention.

FIG. 8 depicts a system 800 for receiving and processing the request access OFDM burst of FIG. 3. System 800 is depicted to take advantage of multiple antennas but the present invention may also be employed in conjunction with a single receiver antenna. System 800 would typically be implemented within central access point 102.

RF signals from subscriber units 104 are received via $M_R$ receiver antennas 802. For each of antennas 802, there is a receiver system 804 that performs all the analog to digital signal processing operations necessary to recover baseband time domain symbols from the received RF signals. For each antenna, one of FFT blocks 806 removes the cyclic prefix from successive OFDM time domain bursts and converts the time domain symbols to the frequency domain. Phase descrambling blocks 808 removes the effects of the phase scrambling code as was described in reference to FIG. 5.

For each antenna 802, a differential decoding stage 810 recovers the differentially encoded access request data based on the frequency domain symbols output by the corresponding FFT block 806 as phase descrambled by phase descrambling blocks 808. For each two successive phase descrambled frequency domain symbols, each differential decoder finds detection symbols:

$$a_i(n,k) = x_i^*(n,k) x_i(n+1,k)$$

where x refers to a received frequency domain symbol, i identifies a particular antenna, n identifies a frequency domain symbol position within a burst, and k identifies a particular burst.

A combination element 812 combines the detection symbols obtained via the multiple antennas from differential decoding stages 810 to form a combined detection symbol estimate. In one embodiment, combination element 112 finds the combined detection symbol to be:

$$a(n,k) = \sum_{i=1}^{M_R} a_i(n,k)$$

The recovered phase difference value is then:

$$\hat{z}(n,k) = \angle a(n,k).$$

The output of combination block 812 is preferably the series of cost metric or soft decision values to be used by a Viterbi decoder to remove the effects of error correction coding. The cost metric values are estimated to be:

$$c(n,k) = |a(n,k)|^2 |\hat{z}(n,k) - \bar{z}(n,k)|^2$$

where $\bar{z}(n,k)$ is the nearest ideal phase difference value to $\hat{z}(n,k)$. For example, the ideal phase difference values for QPSK would be $\{0, \pi/2, -\pi/2, \pi\}$.

The term $|a(n,k)|^2$ serves as a confidence value which weights phase differences received by the various antennas according to their associated symbol magnitudes.

These cost metric values as described above are generated on a symbol by symbol basis. U.S. patent application Ser. No. 09/282,589 describes a technique for developing cost metric values for individual bits rather than symbols. In the above equations symbols that are repeated due to the use of repetition coding are treated as if they are received via multiple antennas.

It is understood that the examples and embodiments described herein are for illustrative purposes only and that various modifications or changes in light thereof will be suggested to persons skilled in the art and are to be included within the spirit and purview of this application and scope of the appended claims and their full scope of equivalents. For example, the present invention may be applied to wireline systems. All publications, patents, and patent applications cited herein are hereby incorporated by reference.

What is claimed is:

1. In a digital communication system employing a shared medium, a method for operating a selected data communication device to request access to said shared medium, said method comprising:

forming frequency domain symbols of an OFDM burst, wherein a first group of frequency domain symbols comprise differentially encoded data and a second group of frequency domain symbols comprise zero values to reserve said second group for data transmitted by other subscriber units;

transforming said frequency domain symbols of said OFDM burst into time domain symbols; and transmitting said time domain symbols as a request for access to said shared medium.

2. The method of claim 1 wherein values of said frequency domain symbols of said first group repeat within said first group to implement repetition coding.

3. The method of claim 1 wherein forming comprises:

providing a phase scrambling code that specifies phase shifts for frequency domain positions within said OFDM burst; and applying said phase shifts of said phase scrambling code to frequency domain symbols of said first group according to positions of said frequency domain symbols within said OFDM burst.

4. In a digital communication system employing a shared medium, a method for operating a central access point to receive requests for access to said shared medium, said method comprising:

receiving an OFDM burst of time domain symbols;

converting said OFDM burst of time domain symbols into frequency domain symbols;

differentially decoding said frequency domain symbols;

obtaining access requests from multiple subscriber units; and providing a phase descrambling code that specifies phase shifts for frequency domain positions within said OFDM burst; and applying said phase shifts of said phase descrambling code to said frequency domain symbols according to positions of said frequency domain symbols.

5. The method of claim 4 wherein receiving comprises receiving via multiple antennas, converting and differentially decoding are performed independently for each of said multiple antennas, and access requests obtaining comprises combining differential decoding results for said multiple antennas.

6. In a digital communication system employing a shared medium, a method for operating a selected data communication device to request access to said shared medium, said method comprising:

forming frequency domain symbols of an OFDM burst, wherein a first group of frequency domain symbols comprise non-zero values and a second group of frequency domain symbols comprise zero values to reserve said second group for data transmitted by other data communication devices, said first group of frequency domain symbols being contiguous to one another;

transforming said frequency domain symbols of said OFDM burst into time domain symbols; and transmitting said time domain symbols as a request for access to said shared medium.

7. The method of claim 6 wherein said first group of symbols comprises symbols carrying access request data and training symbols having predetermined values to facilitate channel estimation.

8. The method of claim 7 wherein said symbols carrying access request data are repeated to implement repetition coding.

9. The method of claim 7 wherein the number of said training symbols is less than v, a number of symbol periods in the duration of an impulse response of a channel from said selected data communication device to a central access point.

10. In a digital communication system employing a shared medium, a method for operating a central access point to receive requests for said shared medium, said method comprising:

receiving an OFDM burst of time domain symbols;

converting said OFDM burst of time domain symbols into frequency domain symbols;

obtaining from a first subgroup of said frequency domain symbols a first request for access to said shared medium from a first subscriber unit, wherein frequency domain symbols of said first subgroup are contiguous to one another; and obtaining from a second subgroup of said frequency domain symbol a second request for access to said shared medium from a second subscriber unit, wherein frequency domain symbols of said second subgroup are contiguous to one another.

11. The method of claim 10 wherein said first subgroup of frequency domain symbols comprises a plurality of training symbols, wherein a number of said training symbols is less than a number of symbol periods in a duration of an impulse response of a channel from said first subscriber unit to said central access point.

12. The method of claim 10 wherein said first subgroup of frequency domain symbols comprises a plurality of data symbols and a plurality of training symbols, said method further comprising:

estimating a response for a subband corresponding to said first group of frequency domain symbols based on said training symbols.

13. The method of claim 12 wherein estimating comprises interpolating between channel response estimates based on said training symbols.

14. The method of claim 13 wherein receiving comprises receiving via multiple antennas, converting is performed independently for each of said multiple antennas, and wherein obtaining comprises optimally combining frequency domain symbols converted via each of said multiple antennas.

15. In a digital communication system employing a shared medium, apparatus for operating a selected data communication device to request access to said shared medium, said apparatus comprising:

a burst forming system that forms frequency domain symbols of an OFDM burst, wherein a first group of frequency domain symbols comprise differentially encoded data and a second group of frequency domain symbols comprise zero values to reserve said second group for data transmitted by other subscriber units;

a converter that transforms said frequency domain symbols of said OFDM burst into time domain symbols; and a transmitter system that transmits said time domain symbols as a request for access to said shared medium.

16. The apparatus of claim 15 wherein values of said frequency domain symbols of said first group repeat within said first group to implement repetition coding.

17. The apparatus of claim 15 wherein said burst forming system comprises:
- a phase scrambling block that provides a phase scrambling code that specifies phase shifts for frequency domain positions within said OFDM burst; and
- a phase rotator that applies said phase shifts of said phase scrambling code to frequency domain symbols of said first group according to positions of said frequency domain symbols within said OFDM burst.

18. In a digital communication system employing a shared medium, apparatus for operating a central access point to receive requests for access to said shared medium, said apparatus comprising:
- a receiver system that receives an OFDM burst of time domain symbols;
- a converter that converts said OFDM burst of time domain symbols into frequency domain symbols, groups of said frequency domain symbols resulting from transmissions by multiple subscriber units;
- a differential decoder that differentially decodes said frequency domain symbols; and
- a phase descrambling block that provides a phase descrambling code that specifies phase shifts for frequency domain positions within said OFDM burst; and
- a phase rotator that applies said phase shifts of said phase descrambling code to said frequency domain symbols according to positions of said frequency domain symbols.

19. The apparatus of claim 18 wherein at least one of said groups comprises an access request from a selected subscriber unit.

20. The apparatus of claim 18 wherein said receiver system and said converter and said differential decoder are duplicated for each of multiple antennas.

21. In a digital communication system employing a shared medium, apparatus for operating a selected data communication device to request access to said shared medium, said apparatus comprising:
- a burst forming system that forms frequency domain symbols of an OFDM burst, wherein a first group of frequency domain symbols comprise non-zero values and a second group of frequency domain symbols comprise zero values to reserve said second group for data transmitted by other data communication devices, said first group of frequency domain symbols being contiguous to one another;
- a converter that transforms said frequency domain symbols of said OFDM burst into time domain symbols; and
- a transmitter system that transmits said time domain symbols as a request for access to said shared medium.

22. The apparatus of claim 21 wherein said first group of symbols comprises symbols carrying access request data and training symbols having predetermined values to facilitate channel estimation.

23. The apparatus of claim 22 wherein the number of said training symbols is less than a number of symbol periods in the duration of an impulse response of a channel from said selected data communication device to a central access point.

24. The apparatus of claim 21 wherein said symbols carrying access request data are repeated to implement repetition coding.

25. In a digital communication system employing a shared medium, apparatus for operating a central access point to receive requests for access to said shared medium, said apparatus comprising:
- a receiver system that receives an OFDM burst of time domain symbols;
- a converter that converts said OFDM burst of time domain symbols into frequency domain symbols; and
- a selector that obtains from a first subgroup of said frequency domain symbols a first request for access to said shared medium from a first subscriber unit, wherein frequency domain symbols of said first subgroup are contiguous to one another, and that obtains from a second subgroup of said frequency domain symbol a second request for access to said shared medium from a second subscriber unit, wherein frequency domain symbols of said second subgroup are contiguous to one another.

26. The apparatus of claim 25 wherein said first subgroup of frequency domain symbols comprises a plurality of training symbols, wherein a number of said training symbols is less than v, a number of symbol periods in a duration of an impulse response of a channel from said first subscriber unit to said central access point.

27. The apparatus of claim 25 wherein said first subgroup of frequency domain symbols comprises a plurality of data symbols and a plurality of training symbols, said apparatus further comprising:
- a channel response estimator that estimates a response for a subband corresponding to said first group of frequency domain symbols based on said training symbols.

28. The apparatus of claim 27 wherein said channel response estimator interpolates between channel response estimates based on said training symbols.

29. The apparatus of claim 28 wherein said receiver system and converter are duplicated for each of multiple antennas.

30. In a digital communication system employing a shared medium, a method for operating a selected data communication device to request access to said shared medium, said apparatus comprising:
- means for forming frequency domain symbols of an OFDM burst, wherein a first group of frequency domain symbols comprise differentially encoded data and a second group of frequency domain symbols comprise zero values to reserve said second group for data transmitted by other subscriber units;
- means for transforming said frequency domain symbols of said OFDM burst into time domain symbols; and
- means for transmitting said time domain symbols as a request for access to said shared medium.

31. In a digital communication system employing a shared medium, a method for operating a selected data communication device to request access to said shared medium, said apparatus comprising:
- means for forming frequency domain symbols of an OFDM burst, wherein a first group of frequency domain symbols comprise non-zero values and a second group of frequency domain symbols comprise zero values to reserve said second group for data transmitted by other data communication devices, said first group of frequency domain symbols being contiguous to one another;

means for transforming said frequency domain symbols of said OFDM burst into time domain symbols; and means for transmitting said time domain symbols as a request for access to said shared medium.

32. In a digital communication system employing a shared medium, apparatus for operating a central access point to receive requests for said shared medium, said apparatus comprising:

means for receiving an OFDM burst of time domain symbols;

means for converting said OFDM burst of time domain symbols into frequency domain symbols;

means for obtaining from a first subgroup of said frequency domain symbols a first request for access to said shared medium from a first subscriber unit, wherein frequency domain symbols of said first subgroup are contiguous to one another; and means for obtaining from a second subgroup of said frequency domain symbol a second request for access to said shared medium from a second subscriber unit, wherein frequency domain symbols of said second subgroup are contiguous to one another.

* * * * *